United States Patent

Sato et al.

[11] Patent Number: 5,093,744
[45] Date of Patent: Mar. 3, 1992

[54] REMOTE COMMANDER

[75] Inventors: Masaru Sato; Hatsuhiko Shinoda, both of Tokyo; Kiyoshi Kai, Kanagawa, all of Japan

[73] Assignee: Sony Corporation, Tokyo, Japan

[21] Appl. No.: 388,476

[22] Filed: Aug. 2, 1989

[30] Foreign Application Priority Data

Aug. 29, 1988 [JP] Japan .................... 63-214353

[51] Int. Cl.⁵ .................................... H04B 10/00
[52] U.S. Cl. .................................... 359/142
[58] Field of Search ........ 455/603, 600, 605; 358/194.1; 341/176

[56] References Cited

U.S. PATENT DOCUMENTS 3,869,671 3/1975 Schroder .................. 375/83
3,916,378 10/1975 Schroder .................. 331/128
4,089,062 5/1978 McElroy et al. .......... 364/700
4,322,724 3/1982 Grudzinski ................ 340/595
4,964,073 10/1990 Watanabe ................. 364/707

Primary Examiner—Curtis Kuntz
Assistant Examiner—L. Pascal
Attorney, Agent, or Firm—Lewis H. Eslinger; Donald S. Dowden

[57] ABSTRACT

A remote commander transmits a command signal from a light emitting element controlled by a transmitting integrated circuit to an apparatus to be controlled. A single low voltage battery drives the remote commander, and a booster circuit boosts the low voltage supplied by the battery. The light emitting element and the transmitting integrated circuit are driven by the output voltage from the booster circuit.

7 Claims, 4 Drawing Sheets

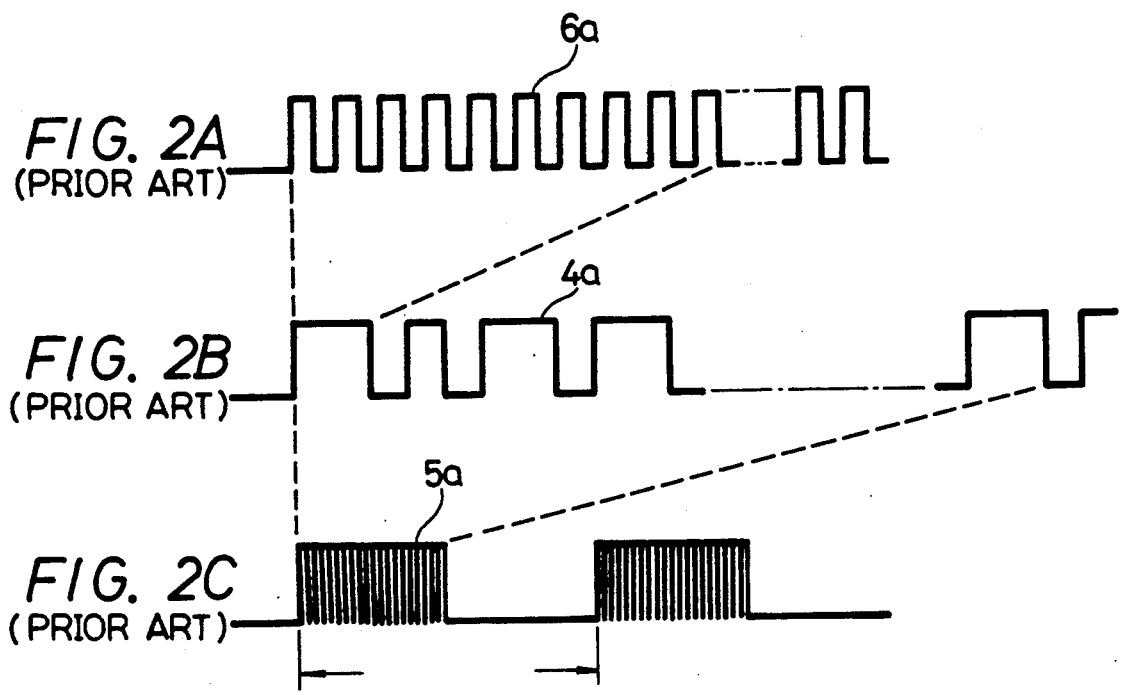
FIG. 2A (PRIOR ART)
FIG. 2B (PRIOR ART)
FIG. 2C (PRIOR ART)
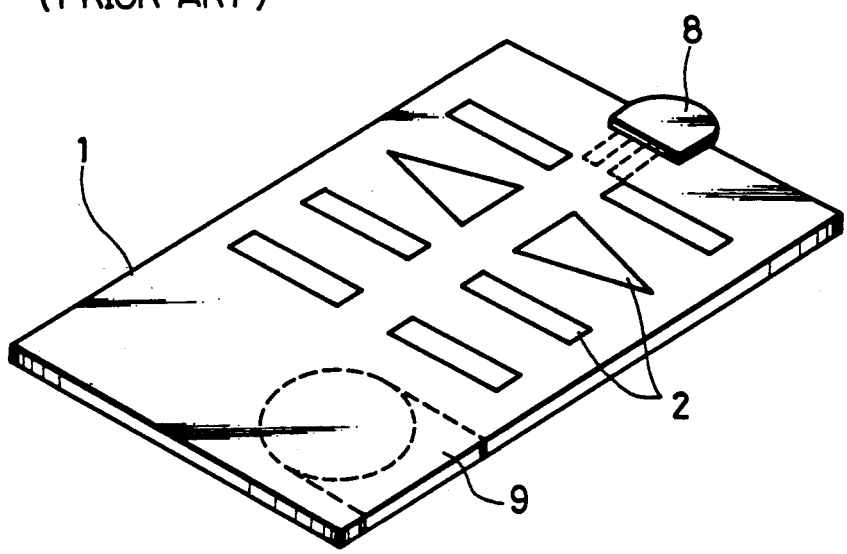
FIG. 3 (PRIOR ART)

1

REMOTE COMMANDER

BACKGROUND OF THE INVENTION

1. Field of the Invention

The present invention relates generally to remote commanders and more particularly to a remote commander of small size which is suitably used for remote control of a television receiver or the like.

2. Description of the Prior Art

Known remote commanders of wireless type are designed to transmit a command signal such as radio waves, ultrasonic waves and infrared rays. Most of the remote commanders now available are designed to transmit a command signal such as a pulsed signal obtained by pulsing infrared rays on and off.

FIG. 1 is a schematic block diagram showing an example of a prior-art digital remote commander utilizing infrared rays as a command signal.

In FIG. 1, a remote commander 1 includes keys 2 such as a power switch, a channel-up key, a channel-down key, a sound volume-up key, and a sound volume-down key for a television receiver and a picture search mode key for a videotape recorder (VTR), etc. When any of these keys 2 is pressed, key data corresponding to the pressed key 2 is generated by a key decoder 3. The key data from the key decoder 3 is supplied to a data encoder 4 that produces a data code 4a. The waveform of the data code 4a is represented in FIG. 2B. The data code 4a from the data encoder 4 is fed to a modulator 5. The modulator 5 is also supplied with a carrier 6a having a frequency from 33 kHz to 40 kHz from a carrier generator 6. The waveform of the carrier 6a is represented in FIG. 2A. The modulator 5 modulates the carrier 6a by the data code 4a and generates a command signal 5a. The command signal 5a is generated at every frame as shown in FIG. 2C. The command signal 5a from the modulator 5 is amplified by an amplifier 7 and is transmitted through a light emitting element 8 such as a light emitting diode (LED) or the like to a controlled apparatus 10, for example, a television receiver or the like, as infrared rays. In FIG. 1, reference numeral 9 designates a power source such as a battery (or dry cell) of size AA of 1.5 V according to the ISO (International Organization of Standards). In this example, the remote commander 1 needs two batteries to drive its respective circuits.

In the controlled apparatus (e.g., television receiver) 10, the infrared rays are received by a light receiving element 11. The light receiving element 11 can be a photodiode or the like. The infrared rays received are then amplified by an amplifier 12, and the amplified signal is amplitude-limited by a limiter 13. The output signal from the limiter 13 is detected by a detector 14 and the data thereof is decoded by a decoder 15. The decoder 15 is directly supplied with data from a key apparatus 16 of the television receiver 10. In response to the data decoded by the decoder 15, a pulse generator 17, a flip-flop circuit 18, a digital-to-analog (D/A) converter 19 or the like are operated to perform the channel-up or -down operation, the switching operation of the switch, the sound volumn-up or -down operation or the like.

Recently, the prior-art remote commander 1 as described above has been designed to decrease its thickness as shown in FIG. 3 and is formed in, for example, a so-called credit card size. As shown in FIG. 3, the light emitting element 8 of the remote commander 1 or the like is made flat, and the battery 9 is a single button-sized lithium cell of a high voltage type of, for example, 3 V.

In the prior art remote commander 1 as described above, the several circuits 3 to 7 provided in the remote commander 1 are fabricated as integrated circuits so that these circuits 3 to 7 can be operated under small power. There is, however, the problem that much greater power is needed to operate the LED of the light emitting element 8 to emit infrared rays. More specifically, a forward voltage drop of the infrared ray emitting diode is about 2 V so that a high voltage battery is needed to cause a light emitting current to flow. Further, a voltage of at least about 3 V is needed to drive the integrated circuit for transmitting a remote control signal so that two ordinary batteries of size AA of 1.5 V are generally required. While the credit-card type remote commander 1 shown in FIG. 3 needs one battery, the battery used therein is a special high voltage type producing an output voltage of 3 V and formed as a button type. Thus, the prior-art remote commander 1 unavoidably needs a special high voltage battery.

OBJECTS AND SUMMARY OF THE INVENTION

It is an object of the present invention to provide an improved remote commander that avoids the above-mentioned problem encountered with the prior art.

More specifically, it is an object of the present invention to provide a remote commander that can be driven by a single low voltage battery for remote control of a controlled apparatus.

It is another object of the invention to provide a remote commander suitable for use with a television receiver, a videotape recorder or the like.

The foregoing and other objects of the invention are attained according to one aspect thereof by the provision of a remote commander comprising: a light emitting element for transmitting a signal to apparatus to be remotely controlled; a transmitting circuit for controlling the light emitting element; a low voltage battery producing a low voltage output; and booster means for boosting the low voltage output to produce a relatively high driving voltage, the light emitting element and the transmitting circuit being driven by the relatively high driving voltage.

These and other objects, features and advantages of the present invention will be apparent in the following detailed description of a preferred embodiment of the invention when read in conjunction with the accompanying drawings, in which like reference numerals are used to identify the same or similar parts.

BRIEF DESCRIPTION OF THE DRAWINGS

FIGS. 2A, 2B and 2C are waveform diagrams of signals generated by respective circuits in the prior-art remote commander shown in FIG. 1;

FIG. 3 is a perspective view of a prior-art remote commander of a credit card type;

DESCRIPTION OF THE PREFERRED EMBODIMENT

Figure 1:
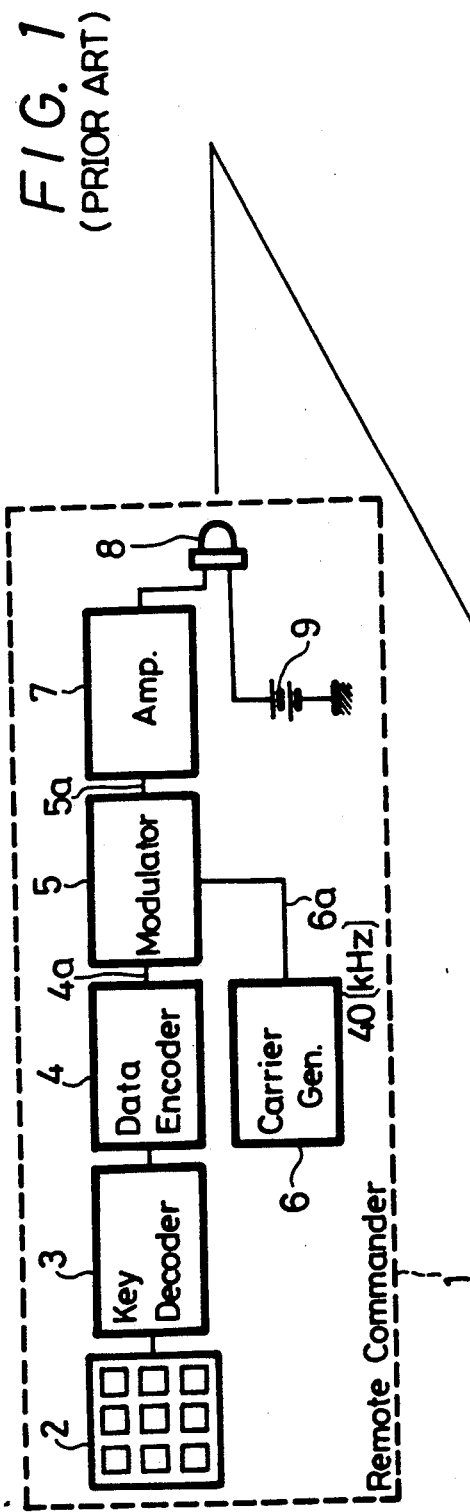
FIG. 1 is a schematic block diagram showing an example of a prior-art remote commander.
Figure 1:
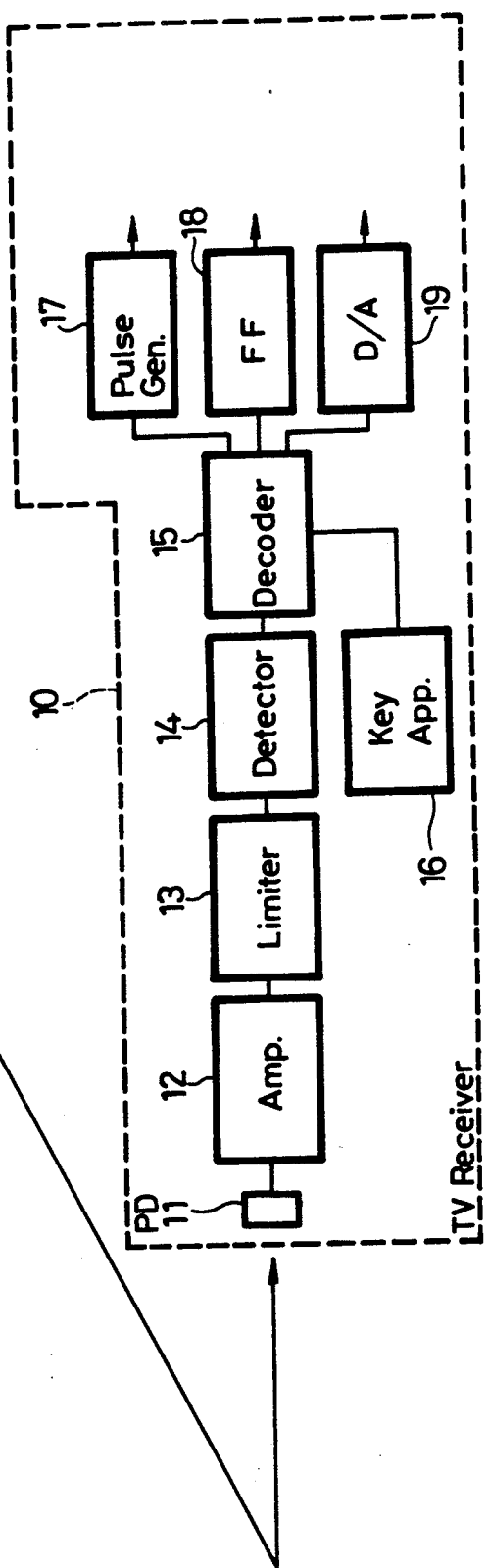
Figure 4:
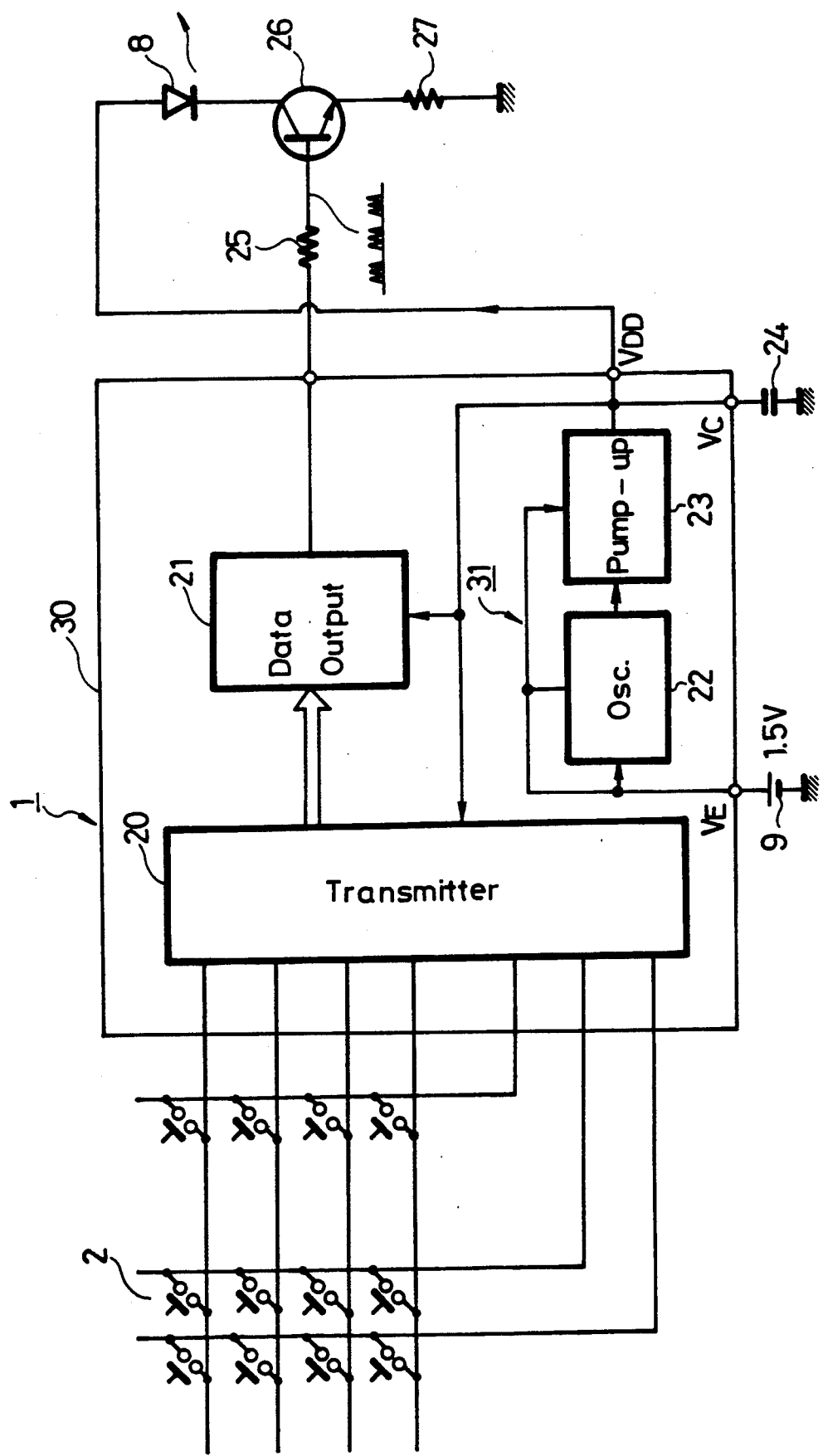
FIG. 4 is a schematic block diagram showing an embodiment of a remote commander according to the present invention.

An embodiment of a remote commander according to the present invention will hereinafter be described in detail with reference to FIGS. 4 and 5. In FIG. 4, parts corresponding to those of FIG. 1 are marked with the same references and therefore need not be described in detail.

In FIG. 4, the keys 2 are arranged in a two-dimensional fashion, or matrix form. A plurality of column lines of the keys 2 are connected to a transmitting circuit 20 which includes a key scanning circuit fabricated as an integrated circuit (IC), though not shown, and a plurality of row lines of the keys 2 are also connected to the transmitting circuit 20 which also includes the key decoder and the data encoder which are also fabricated as integrated circuits. The outputs of the key decoder and the data encoder are supplied to a data output circuit 21 which is fabricated as an integrated circuit. The output of the data output circuit 21 is supplied through a resistor 25 to the base of a switching transistor 26 for the light emitting diode (LED) 8 so as to bias the base of the switching transistor 26. The emitter of the switching transistor 26 is grounded via a resistor 27 and the collector thereof is connected to the cathode electrode of the LED 8. The anode electrode of the LED 8 is connected to an output terminal $V_{DD}$ of a voltage increasing or booster circuit 31 which boosts the voltage of the battery 9. A battery terminal $V_E$ of a transmission IC (integrated circuit) 30 is connected to the anode electrode of the size AA battery 9 of 1.5 V, and the cathode electrode of the battery 9 is grounded. A capacitor terminal Vc of the transmission IC 30 is connected to one electrode of an electrolytic capacitor 24 of a relatively large capacity of about 200 to 1000 μF, and the other electrode of the electrolytic capacitor 24 is grounded. An oscillation circuit 22 and a pump-up circuit 23 are driven by the battery 9 of 1.5 V, and the output of the oscillation circuit 22 is supplied to the pump-up circuit 23. A voltage that is higher than 3 V and supplied as an output by the pump-up circuit 23 charges the capacitor 24. The charge and discharge voltages of the capacitor 24 are used to drive the oscillation circuit 22 and the pump-up circuit 23 and also the IC transmission circuit 20, the IC output circuit 21 and the LED 8.

Figure 5:
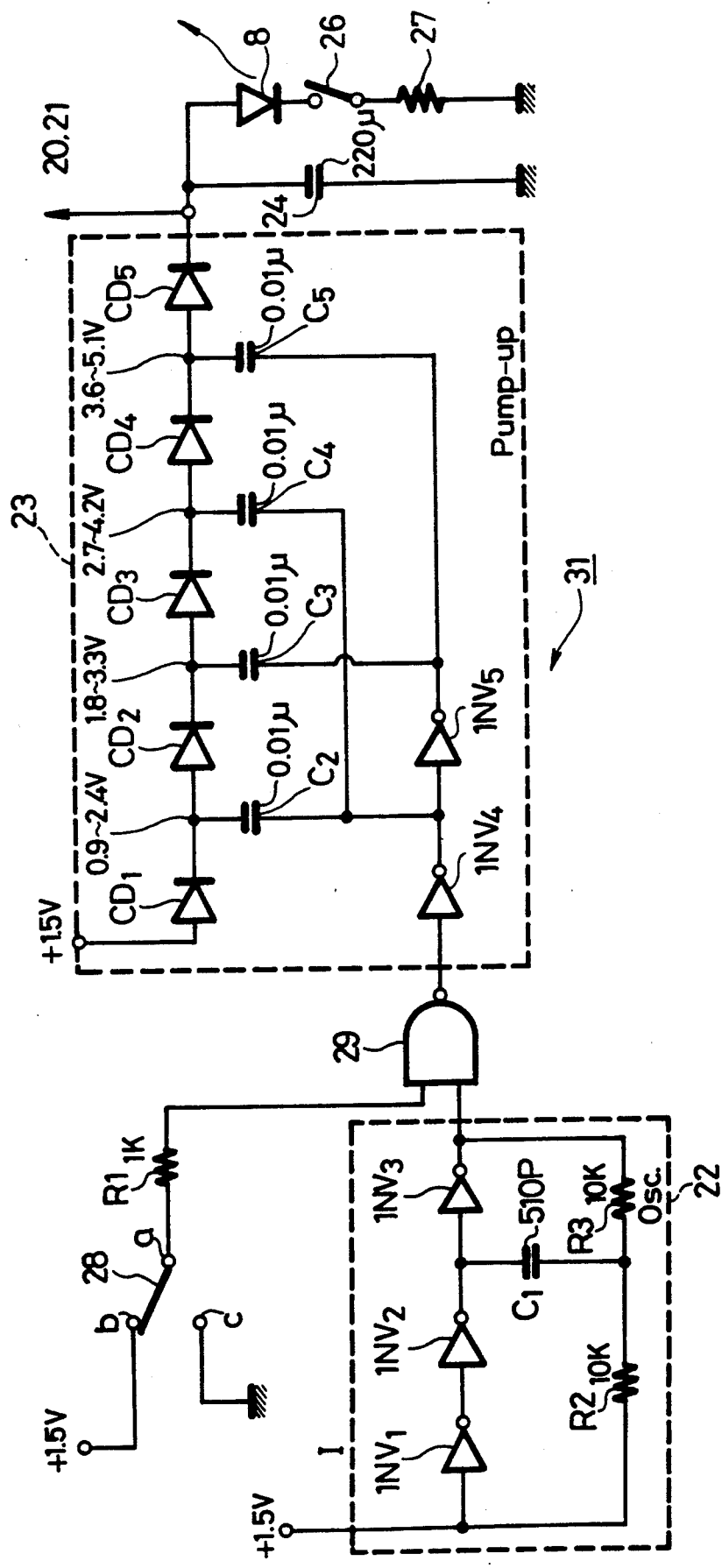
FIG. 5 is a circuit diagram of a voltage booster circuit formed of an oscillating circuit and a pump-up circuit and which is used in the remote commander of the present invention.

FIG. 5 is a circuit diagram showing an example of the booster circuit 31 which is formed of the oscillation circuit 22 and the pump-up circuit 23 shown in FIG. 4.

As FIG. 5 shows, the oscillating circuit 22 is formed of inverters $INV_1$, $INV_2$, $INV_3$, a capacitor $C_1$ and resistors $R_2$, $R_3$ which are fabricated as a MOS IC. The oscillation circuit 22 produces an oscillating rectangular wave signal output and is connected to the 1.5 V battery 9 provided as the low voltage source.

The oscillation frequency of the oscillation circuit 22 can be varied by changing resistance values of the resistors $R_2$, $R_3$ and the capacity of the capacitor $C_1$. Experimental results indicate that with the time constant determined by the values illustrated in FIG. 5, a power source voltage of 1.0 V results in an oscillation frequency of 9.43 kHz, of 2 V results in an oscillation frequency of 82.0 kHz, and of 3 V results in an oscillation frequency of 87.7 kHz. The output of the oscillation circuit 22 is supplied to one input terminal of a NAND gate circuit 29. An output of a standby switch 28 is supplied through a resistor $R_1$ to the other input terminal of the NAND gate circuit 29. One fixed contact b of the standby switch 28 is connected to the positive terminal of the 1.5 V battery 9, and the other fixed contact c thereof is grounded. The movable contact a of the standby switch 28 is connected to one end of the resistor $R_1$. The output of the NAND gate circuit 29 is supplied to an inverter $INV_4$ which forms a part of the pump-up circuit 23. The output terminal of the inverter $INV_4$ is connected to the next inverter $INV_5$, thus forming a driver circuit. The output terminal of the inverter $INV_4$ is also connected to first sides of capacitors $C_2$ and $C_4$ while the output terminal of the inverter $INV_5$ is connected to first sides of capacitors $C_3$ and $C_5$. Diodes or Zener diodes $CD_1$, $CD_2$, $CD_3$, $CD_4$ and $CD_5$ are serially connected. The anode electrode of the diode $CD_1$ is connected to the +1.5 V of the low voltage battery 9, and the cathode electrodes of the booster diodes $CD_1$, $CD_2$, $CD_3$ and $CD_4$ are respectively connected to the other sides of the capacitors $C_2$, $C_3$, $C_4$ and $C_5$. The cathode electrode of the reverse-current blocking diode $CD_5$ is connected to one electrode of the capacitor 24 of a large capacity for charging and discharging, to the anode electrode of the LED 8 for emitting the infrared rays, to the transmitting circuit 20 and to the output circuit 21 (see also FIG. 4).

The other electrode of the capacitor 24 is grounded, and the cathode electrode of the LED 8 is grounded via the resistor 27 and the switching means formed of the driving transistor 26 (FIG. 4). The pump-up circuit 23, the oscillation circuit 22, the standby switch 28, and the capacitor 24 constitute the booster circuit 31.

The VF (DC forward voltage drop) of each of the booster diodes $CD_1$ to $CD_4$ is about 0.6 V and the voltage boost (disregarding the forward voltage drop) is 1.5 V, so that when the standby switch 28 is in its on-state, the output voltage of each of the booster diodes $CD_1$ to $CD_4$ is sequentially increased from an initial value of 1.5 V successively to 2.4 V, 3.3 V, 4.2 V and 5.1 V. The charge stored in the capacitor 24, taking into account a voltage drop of 0.6 V across the capacitor $CD_5$, is 4.5 V and is used as the voltage source for the transmitting circuit 20 and for the output circuit 21, thereby providing a voltage three times higher than the battery voltage. If the switching transistor 26 is turned on next, the large current charge stored in the capacitor 24 is discharged and the discharge energy thereof drives the LED 8 to emit infrared rays. Thus, the transmission of infrared rays is intermittently effected.

According to the present invention, as described above, since the oscillation circuit 22, the low impedance driving FET, the inverters $INV_4$ and $INV_5$ and the pump-up circuit 23 are fabricated as an integrated circuit (IC) within the transmitting IC 30, which is formed as one body with the prior-art transmitting circuit 20 and the output circuit 21, the remote commander of the present invention can be made inexpensive and compact in size. Thus, the remote commander of the present invention can be driven by the single low voltage battery of 1.5. V.

While in the above-mentioned embodiment the pump-up circuit 23 is employed, other booster circuits may also be utilized.

According to the present invention, the infrared LED can be driven to emit infrared rays by the single low voltage battery of about 1.5 V, and also the transmitting IC can be driven.

The description given above of a single preferred embodiment of the invention is presented by way of example; many modifications and variations thereof can be effected by persons having ordinary skill in the art without departing from the spirit and scope of the novel concepts of the invention, so that the scope of the invention should be determined only by the appended claims.

We claim:

1. A remote commander comprising:
    a light emitting element for transmitting a signal to apparatus to be remotely controlled;
    a transmitting circuit for controlling said light emitting element;
    a low voltage battery producing a low voltage output; and
    booster means comprising an oscillation circuit and a pump-up circuit, said oscillation circuit being powered by said low voltage output and producing an oscillating output signal having a frequency that depends on the value of said low voltage output and said pump-up circuit being powered by said low voltage output and responsive to said oscillating output signal for boosting said low voltage output to produce a relatively high driving voltage, said relatively high driving voltage supplying the power for said transmitting circuit and said light emitting element.

2. A remote circuit according to claim 1 wherein said transmitting circuit and booster means are formed as in integrated circuit.

3. A remote commander according to claim 1 wherein said relatively high driving voltage is substantially three times higher than said low voltage output.

4. A remote commander according to claim 1 wherein said low voltage output is substantially 1.5 V.

5. A remote commander according to claim 4 wherein said relatively high driving voltage is substantially 4.5 V.

6. A remote commander according to claim 1 wherein said low voltage battery is an AA battery.

7. A remote commander according to claim 1 wherein said transmitting circuit is formed as an integrated circuit.

* * * * *